ced Feb. 12, 1935

1,990,615

UNITED STATES PATENT OFFICE 1,990,615

WAX

Herbert Rodrian, Cologne-Mulheim, Rudolf Bauer, Cologne-Deutz, and Arnold Doser Cologne-Mulheim, Germany, assignors to I. G. Farbenindustrie Aktiengesellschaft, Frankfort-on-the-Main, Germany No Drawing. Application November 20, 1930, Serial No. 497,062. In Germany November 30, 1929

11 Claims. (Cl. 260—2)

This invention relates to the manufacture of new waxes and to the new products obtainable thereby.

In accordance with the present invention new and technically valuable waxes are obtained in a simple manner and in satisfactory yields by causing natural or artificially produced waxes to interact with 1.2-alkylene oxides in the presence or absence of an indifferent organic diluent. Mixtures of waxes with one another or of waxes with hydrocarbons or carboxylic acids or anhydrides can be employed in this process. The products thus obtained presumably contain polyglycol-esters of the acids of the waxes.

The esters of these acids of waxes with polyhydric alcohols have already been obtained by causing the wax acids in question to react with polyhydric alcohols. In this reaction elimination of water occurs, but in the new process addition of alkylene oxide to the wax acids takes place, the said addition proceeding with extraordinary rapidity and ease.

The present process is carried out for instance by heating waxes, for example, Montan wax or conversion products thereof, carnauba wax, shellac wax or the like with 1.2-alkylene oxides in a closed vessel to elevated temperatures, say to temperatures between about 100 and 200° C. Compounds of the kind in question are, for example, ethylene oxide, propylene oxide, glycide, (glycerine anhydride), trimethylene oxide and the like.

Depending on the duration of the reaction, the temperature employed and the respective proportions, the most varied kind of waxes are produced, possessing very valuable technical properties. In addition to the advantageous properties already possessed by waxes which have been treated with polyhydric alcohols, such as increased capacity for binding oil and improved consistency of the polishes produced therefrom, the waxes obtainable in accordance with this process display further considerable advantages.

In the above process there occurs frequently, besides a chemical change of the wax, a change also in the physical properties thereof: the melting point is lowered and a considerable elasticity and plasticity of the new product are produced. In the present case products are obtained the physical properties of which are similar to those of natural beeswax and japan wax as regards their melting point and consistency. It is a further feature of the invention, as above indicated, that the said properties of the new products can be still further improved by subjecting to treatment with 1.2-alkylene oxides instead of the waxes themselves, mixtures thereof or mixtures of waxes with hydrocarbons, such as paraffin, ozokerite, ceresine, which do not themselves take part in the reaction, mixtures of waxes with organic acids or acid anhydrides, such as oleic acid, phthalic anhydride, resinic acid or naphthenic acid. In this manner waxes can be produced possessing, for example, a quite extraordinary plasticity or pronounced elasticity and which for this reason appear to be well suited for special purposes. By the process, which is substantially an esterification process, products can be obtained the properties of which are similar to those of beeswax and japan wax, said waxes having a relatively high acid number and a relatively low esterification number. The polyglycol esters formed can be emulsified extraordinarily readily by alkaline agents or soaps, and indeed the reaction can be carried out in such a manner that waxes are produced, which, on saponification, yield completely clear aqueous solutions of the wax in question.

The following examples illustrate the invention without limiting it thereto:

*Example 1.*—300 parts by weight of oxidized Montan wax and 60 parts by weight of naphthenic acid are heated to 140–150° C. for 8 hours in a closed vessel with 100 parts by weight of ethylene oxide. A wax is produced with the following characteristics: melting point 68° C., acid number 40, ester number 125. This wax can, by combined treatment with potassium carbonate and Marseilles soap, be brought into an almost clear solution of 5% concentration.

*Example 2.*—200 parts by weight of oxidized Montan wax and 50 parts by weight of phthalic anhydride are heated to 140–170° C. for 8 hours in a closed vessel with 150 parts by weight of propylene oxide. The reaction product is washed with boiling water and dried. The wax is obtained with the characteristics: melting point 72° C., acid number 1, ester number 199. This wax is distinguished by extraordinarily good plasticity.

*Example 3.*—200 parts by weight of oxidized Montan wax and 40 parts by weight of phthalic anhydride are heated to 150° C. for 8 hours in a closed vessel with 80 parts by weight of ethylene oxide. The reaction product is washed with hot water and dried. The wax produced is of rubber-like elasticity and possesses the following characteristics: melting point 70–71° C., acid number 8, ester number 205.

*Example 4.*—300 parts by weight of shellac wax and 60 parts by weight of ethylene oxide are heated to 120° C. for four hours in a closed vessel. A wax is produced with the following characteristics: melting point 72° C., acid number 0, ester number 50. This wax had before the above mentioned treatment the melting point 72° C., acid number 10 and ester number 37.

*Example 5.*—By melting together equal parts by weight of the products obtainable in accordance with Examples 2 and 3 a wax is produced, which in plasticity and elasticity possesses very great similarity to natural beeswax.

We claim:

1. The process which comprises causing an alkylene oxide in which the oxygen atom is connected to two vicinal carbon atoms to react upon a wax at a temperature between 100° and 200° C.

2. The process which comprises causing an alkylene oxide in which the oxygen atom is connected to two vicinal carbon atoms to react upon a wax in the presence of an inert organic solvent at a temperature between 100° and 200° C.

3. The process which comprises causing an alkylene oxide in which the oxygen atom is connected to two vicinal carbon atoms to react upon a wax to which a carboxylic acid anhydride has been added at a temperature between 100° and 200° C.

4. The process which comprises causing propylene oxide to react upon a wax at a temperature between 100 and 200° C.

5. The process which comprises causing propylene oxide to react upon a wax to which a carboxylic acid anhydride has been added at a temperature between 100 and 200° C.

6. The process which comprises causing propylene oxide to react upon oxidized Montan wax at a temperature between 100 and 200° C.

7. The process which comprises causing propylene oxide to react upon oxidized Montan wax to which a carboxylic acid anhydride has been added at a temperature between 100 and 200° C.

8. The process which comprises causing 150 parts by weight of propylene oxide to react upon a mixture of 200 parts by weight of oxidized Montan wax and 50 parts by weight of phthalic acid anhydride at a temperature between 140 and 170° C.

9. A plastic and elastic, wax-like substance substantially comprising the reaction products of an alkylene oxide in which the oxygen atom is connected to two vicinal carbon atoms and an acid of a wax, said substance having a melting point up to about 72° C. and being a combination of an ester of said acid with a polyglycol together with a high molecular weight wax-like polymerization product of the said alkylene oxide and being capable of forming emulsions with alkaline agents which on saponification yield completely clear aqueous solutions.

10. A plastic and elastic, wax-like substance substantially comprising the reaction products of propylene oxide and an acid of a wax, said substance having a melting point up to about 72° C. and being a combination of an ester of said acid with a polypropylene glycol together with a high molecular weight wax-like polymerization product of the said propylene oxide, and being capable of forming emulsions with alkaline agents which on saponification yield completely clear aqueous solutions.

11. A plastic and elastic, wax-like substance substantially comprising the reaction products of propylene oxide and an oxidized Montan wax, said substance having a melting point up to about 72° C. and being a combination of an ester of the said acid with polypropylene glycol together with a high molecular weight wax-like polymerization product of propylene oxide and being capable of forming emulsions with alkaline agents which on saponification yield completely clear aqueous solutions.

HERBERT RODRIAN.
RUDOLF BAUER.
ARNOLD DOSER.